United States Patent
Andrews et al.

[11] 3,954,323
[45] May 4, 1976

[54] OPTICAL WAVEGUIDE LINEAR MODULATOR ARRAY

[75] Inventors: Ronald A. Andrews, Alexandria, Va.; A. Fenner Milton, Washington, D.C.; Thomas G. Giallorenzi, Alexandria, Va.

[73] Assignee: The United States of America as represented by the Secretary of the Navy, Washington, D.C.

[22] Filed: Mar. 23, 1973

[21] Appl. No.: 344,404

[52] U.S. Cl. .................. 350/96 WG; 350/160 R
[51] Int. Cl.² .................. G02B 5/14; G02F 1/05
[58] Field of Search .................. 350/96 WG, 160 R

[56] References Cited
UNITED STATES PATENTS

| | | | |
|---|---|---|---|
| 3,208,342 | 9/1965 | Nethercot | 350/96 WG UX |
| 3,311,845 | 3/1967 | Koester | 350/96 WG UX |
| 3,614,198 | 10/1971 | Martin et al. | 350/96 WG |
| 3,650,602 | 3/1972 | Lee et al. | 350/160 R |
| 3,674,337 | 7/1972 | Marcatili | 350/96 WG |
| 3,695,745 | 10/1972 | Furukawa | 350/96 WG |
| 3,753,157 | 8/1973 | Ash et al. | 350/96 WG X |

OTHER PUBLICATIONS

Ash et al., "Switchable Optical Waveguide", IBM Technical Disclosure Bulletin, Vol. 14, No. 3, Aug. 1971, pp. 999–1000.

*Primary Examiner*—John K. Corbin
*Attorney, Agent, or Firm*—R. S. Sciascia; Arthur L. Branning; Melvin L. Crane

[57] ABSTRACT

An optical waveguide linear modulator array comprising an optical waveguide having an input coupler and an output coupler. The waveguide or substrate is formed of electrooptical material with different shaped electrodes secured thereto. An electrical field applied between the electrodes modulates the radiation passing through the waveguide so that the radiation may be phase shifted or shaped into desired outputs.

4 Claims, 2 Drawing Figures

OPTICAL WAVEGUIDE LINEAR MODULATOR ARRAY

BACKGROUND OF THE INVENTION

This invention is directed to an optical waveguide which allows the phase front of light propagating in an optical waveguide to be controlled by an electrical signal.

The propagation of light in optical waveguides is of current interest because these systems can perform many dataprocessing and communication functions. Integrated optical technology may be envisioned to combine a system that is capable of modulating, switching, and detecting with optical microcircuitry. A miCrooptical system is desirable since it is rigid, free from environmental effects; and capable of handling greater volumes of information than traditional electronic systems.

Optical waveguides are well known in the art. An optical waveguide consists of a region in which the index of refraction is greater than the index of refraction of the surrounding medium, top and bottom. Such has been set forth in an article "Light Waves In Thin Films and Integrated Optics", P. K. Tien, Applied Optics, 10, page 2395, 1971. Light propagating along the waveguide region will suffer total internal reflection at the boundries between the waveguide region and the surrounding medium if the angle of incidence $\theta$ is greater than the critical angle $\theta_c$, that is, $\theta > \theta_c = \mathrm{Sin}^{-1}(N_{0,2}/N_1)$ where the index of refraction of the upper layer is $N_0$, the waveguide region $N_1$ and the lower layer $N_2$. The light traveling in the waveguide is trapped in the waveguide region by being totally reflected from the upper and lower interfaces between the waveguide region and the upper and lower mediums. There is considerable discussion in the literature concerning various topological shapes of optical waveguides and their characteristics. Waveguides may be flat slabs, rectangular, cylindrical, or any other shape. Metal-clad dielectrics may not be used in optical waveguides due to the high losses. When light is reflected off a metal surface, the energy losses depend on the metal, the wavelength of the light, surface condition, polarization, and angle of incidence, and losses are typically about 1 or 2 percent per reflection. Hence, metal-clad waveguides, because of the number of reflections per centimeter, are extremely lossy in the optical region. In the dielectricclad waveguide, losses are due to absorption in the dielectric and scattering losses. If the cladding has no absorption at the optical wavelength being propagated then no energy is absorbed from the evanescent wave (extending into the cladding) and the waveguide suffers only from scattering losses.

In directing light through an optical propagation path such as the atmosphere, the wavefronts can be distorted by irregularities in the optical path. Heretofore, in attempting to correct for these distortions, the laser beam has been divided into N components and each component is passed through an electrooptic phase modulator. These modulators are bulk effect devices which are generally expensive, they require complex electronics to drive them to produce the desired phase function across the optical beam. Further, to obtain a fine degree of control, N, must be large and the phase sources must be spatially placed close together. For phased array beam steering over large angles, the spacing would have taken on the order of $\lambda$, the wavelength of the radiation.

SUMMARY OF THE INVENTION

This invention provides an apparatus and method for obtaining a continuous linear array of optical sources whose phases are modulated by predetermined functions. The apparatus includes an optical waveguide having an input coupler suitable for coupling desired radiation into the waveguide and an output coupler suitable for coupling radiation out of the waveguide. The waveguide is arranged in combination with a plurality of electrodes along the length of the path of the optical beam in the waveguide. The electrodes have different shapes such that when an electric field is applied across the electrodes, the index of refraction of the waveguide material will be changed due to the electric field. The phase front of the radiation will be affected depending upon the shapes of the electrodes and the strength of the electric field.

STATEMENT OF THE OBJECTS

It is therefore an object of the present invention to provide an apparatus and method for modulating radiation propagating through an optical waveguide.

Another object is to provide an apparatus and method for producing a phased array of optical sources for optical beam steering and for phase front control to correct for irregularties in an optical propagation path.

Still another object is to provide a technique for obtaining a continuous linear array of optical sources whose phases may be easily modulated.

Yet another object is to provide an apparatus and method which is simple in construction and operation to carry out its intended purpose.

Other objects and advantages of the present invention will become obvious from a more careful review of the following specification when considered with the drawing.

DESCRIPTION OF THE INVENTIVE DEVICE

Figure 1:
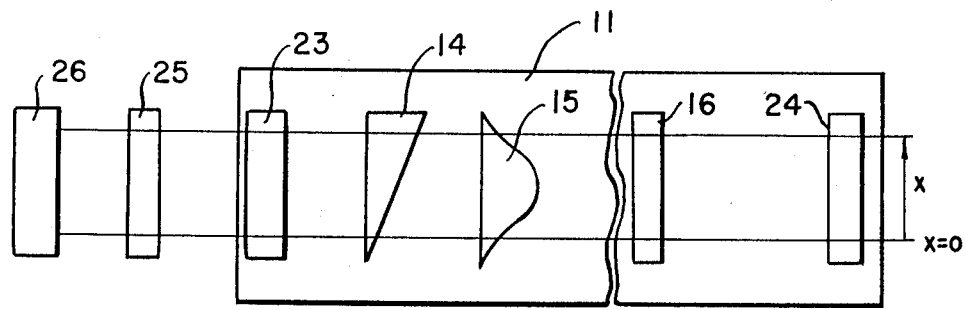
FIG. 1 is a top view of the device illustrating a sample of different shaped electrodes.
Figure 2:
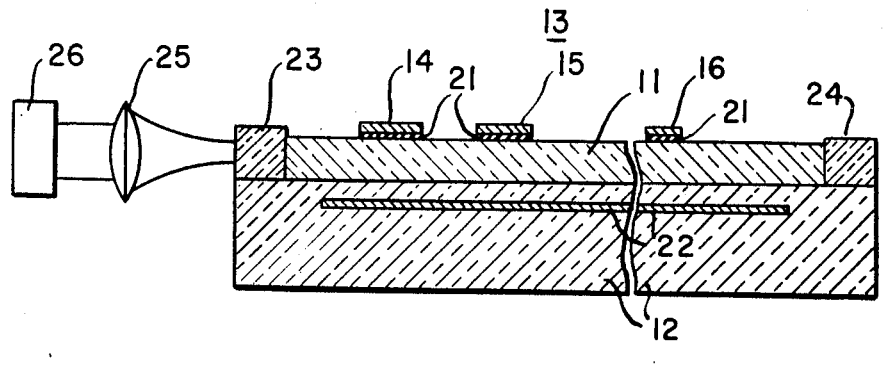
FIG. 2 is a cross sectional view of the device shown in FIG. 1.

Now referring to the drawing, there is shown by illustration an optical waveguide formed by a waveguide layer 11 supported by a substrate 12 having an index of refraction which is less than that of the waveguide layer. The waveguide layer and substrate are surrounded by the surrounding medium 13 within which the waveguide is placed. The surrounding medium has an index of refraction which is less than that of the waveguide layer. As shown, the optical waveguide has associated therewith a plurality of electrodes, only three, 14, 15 and 16, have been shown for illustrative purposes. The electrodes are of different shapes whose shapes are determined by the desired modulation function. The electrodes are applied onto an insulator element 21 which is secured to the waveguide layer. The insulator element 21 is formed of a material having an index of refraction less than that of the waveguide layer. Therefore, the electrodes do not normally affect radiation propagating through the waveguide layer. A common flat plate ground electrode 22 which electrically operates for all of the upper electrodes is formed within the bottom substrate. The common ground electrode is of the same width as the upper electrodes and of a length to include all of the electrodes applied onto the waveguide layer. In order to couple radiation into and out of the waveguide, an input coupler 23 and an output coupler 24 is used in combination with the waveguide. The couplers may be any type well known in the art. As shown, a cylindrical lens 25 in optical alignment with said input coupler focuses radiation onto the input coupler from a desired radiation source such as a well known laser 26.

It has been determined that either the waveguide layer or the substrate may be an electrooptical material. As such, the optical characteristics of the material are affected by an electric field. Thus, radiation propagating through the waveguide layer will be affected by the shape of the electrodes and strength of the electric field through which the radiation passes.

A wide beam of radiation guided through the waveguide layer propagates through the different shaped modulator structures produced by the different shaped electrodes whose shapes are determined by the desired modulation function. In the illustrated drawing, FIG. 1, the electrode 14 is narrower on one side of the beam than at the other end. The electrode so shaped represents a linear phase shift across the linear array. The electrode being narrower at one end than at the other operates such that with a field applied thereto light propagation under the electrode at the wide end receives more of a phase shift than at the narrow end. The amount of phase shift is determined by the voltage applied to the electrode and the strength of the electrooptic effect in the waveguide structure. A linear phase shift such as produced by the electrode shape and applied voltage causes the output beam to scan in the plane of the waveguide. Other functions which will effect the shape of the beam may be added to the waveguide layer as represented by electrodes 15 and 16. Any number of functions may be added and the beam modulated by application of a voltage to a single electrode or a plurality of electrodes separately or simultaneously. The modulated beam is then coupled out of the waveguide layer through the output coupler.

In the above described optical waveguide modulator array, the electrodes extend across the entire width of the radiation beam, therefore, the modulator effect on the radiation beam extends continuously across the beam. As seen by the drawing, different shaped electrodes may be used, therefore, any predetermined type of phase modulation desired may be obtained by shaping the electrode. In use, a simple linear beam scanning function may be accomplished by use of a single modulator element. In more complicated cases, a set of orthogonal functions may be used to simulate any type of beam shaping or steering.

The ground electrode has been shown as a single linear element. However, it may be made into a plurality of elements each corresponding to the electrode on the upper surface of the waveguide layer. The electrodes may be on the same side of the waveguide layer so long as the electric field strength and the direction in the electrooptic media is sufficient to carry out the desired result.

Obviously many modifications and variations of the present invention are possible in the light of the above teachings. It is therefore to be understood that within the scope of the appended claims the invention may be practiced otherwise than as specifically described.

What is claimed is:

1. An optical waveguide modulator array; which comprises,
    a rectangular waveguide layer,
    a rectangular substrate supporting said waveguide layer,
    said substrate having an index of refraction less than that of said waveguide layer,
    a medium on the opposite side of said waveguide layer from said substrate,
    said medium having an index of refraction less than that of said waveguide layer,
    a plurality of pairs of electrodes secured relative to said waveguide layer electrically insulated therefrom and with each pair operative to modulate the phase of radiation passing through said waveguide layer whose length is a function of position across the optical beam,
    one electrode of each pair of electrodes secured on and above said waveguide layer and the other electrode of said pairs secured below said waveguide layer opposite said upper electrode within said substrate, and
    each pair of said electrodes are of different shape.

2. An optical waveguide modulator array; which comprises,
    a rectangular waveguide layer,
    a rectangular substrate supporting said waveguide layer,
    said substrate having an index of refraction less than that of said waveguide layer,
    a medium on the opposite side of said waveguide layer from said substrate,
    said medium having an index of refraction less than that of said waveguide layer,
    a plurality of electrodes secured above said waveguide layer relative thereto electrically insulated therefrom and with each separate electrode operative to modulate the phase of radiation passing through said waveguide layer whose length is a function of position across the optical beam,
    a common ground electrode below said waveguide layer opposite said plurality of electrodes secured above said waveguide layer, and
    each of said plurality of electrodes secured above said waveguide layer are of different shape.

3. An optical waveguide modulator system which comprises;
    a rectangular waveguide layer,
    a rectangular substrate supporting said waveguide layer,
    said substrate having an index of refraction less than that of said waveguide layer,
    a medium on the opposite side of said waveguide layer from that of said substrate,
    said medium having an index of refraction less than that of said waveguide layer,
    a plurality of different shaped pairs of electrodes secured relative to and along said waveguide layer, electrically insulated therefrom and operative to modulate the phase of radiation passing through said waveguide layer whose length is a function of position across the optical beam,
    one electrode of each said pair secured on and above said waveguide layer and the other electrode of each said pair secured below said waveguide layer opposite said upper electrode of said pair within said substrate, a radiation input coupler means secured relative to the input end of said waveguide layer for coupling radiation into said waveguide layer, a focusing lens in optical alignment with said input coupler means for focusing radiation onto said input coupler, and a radiation source for producing desired radiation directed onto said focusing lens.

4. An optical waveguide modulator system which comprises;

a rectangular waveguide layer, a rectangular substrate supporting said waveguide layer, said substrate having an index of refraction less than that of said waveguide layer, a medium on the opposite side of said waveguide layer from that of said substrate, said medium having an index of refraction less than that of said waveguide layer, a plurality of different shaped upper electrodes secured relative to and along the upper surface of said waveguide layer, electrically insulated therefrom and operative to modulate the phase of radiation passing through said waveguide layer whose length is a function of position across the optical beam, a common ground electrode secured below said waveguide layer opposite said plurality of different shaped upper electrodes secured relative to and along the upper surface of said waveguide, a radiation input coupler means secured relative to the input end of said waveguide layer for coupling radiation into said waveguide layer, a radiation output coupler means secured relative to the output for coupling radiation out of said waveguide layer, a focusing lens in optical alignment with said input coupler means for focusing radiation onto said input coupler, and a radiation source for producing desired radiation directed onto said focusing lens.

* * * * *